US012428963B1

(12) United States Patent
Joseph et al.

(10) Patent No.: US 12,428,963 B1
(45) Date of Patent: Sep. 30, 2025

(54) SUCTION SIDE MICRO-RIBLET PATCHES FOR A TURBINE AIRFOIL

(71) Applicants: General Electric Company, Cincinnati, OH (US); GE Avio S.r.l., Rivalta di Torino (IT)

(72) Inventors: John Joseph, Bangalore (IN); Vishnu Vardhan Venkata Tatiparthi, Bangalore (IN); Francesco Bertini, Piossasco (IT); Lyle Douglas Dailey, Cincinnati, OH (US); Paul Hadley Vitt, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/828,009

(22) Filed: Sep. 9, 2024

(51) Int. Cl.
*F01D 5/14* (2006.01)

(52) U.S. Cl.
CPC ........ *F01D 5/145* (2013.01); *F05D 2240/306* (2013.01); *F05D 2240/31* (2013.01)

(58) Field of Classification Search
CPC ............................. F01D 5/145; F05D 2240/30
See application file for complete search history.

(56) References Cited

U.S. PATENT DOCUMENTS 5,133,516 A 7/1992 Marentic et al.
5,337,568 A * 8/1994 Lee .......................... F01D 5/18 60/755
7,878,759 B2 2/2011 Mills et al.
8,235,661 B2 8/2012 Takahashi et al.
8,302,904 B2 11/2012 McKeon et al.
10,107,302 B2 * 10/2018 Berschback ............ F01D 5/141
10,882,606 B2 1/2021 Bertoldi et al.
2014/0248157 A1 9/2014 Ahmad
2021/0231142 A1 7/2021 Smith et al.

FOREIGN PATENT DOCUMENTS

WO WO03104615 A1 12/2003

OTHER PUBLICATIONS

Dellacasagrande et al., Effects of Ribbed Surfaces on Profile Losses of Low-Pressure-Turbine Blades, GT2022-82875, Proceedings of the ASME Turbo Expo 2022: Turbomachinery Technical Conference and Exposition. vol. 10B: Turbomachinery—Axial Flow Turbine Aerodynamics; Deposition, Erosion, Fouling, and Icing; Radial Turbomachinery Aerodynamics. Rotterdam, Netherlands, 2022. (Abstract Only), https //doi.org/10.111S/GT2022-82875.

* cited by examiner

*Primary Examiner* — Sabbir Hasan
(74) *Attorney, Agent, or Firm* — Wood Herron & Evans LLP

(57) ABSTRACT

A turbine airfoil comprises an airfoil defining a leading edge, a trailing edge, a root portion, a tip portion, a chord line defining a chord length of the airfoil, a suction side surface extending in a spanwise direction from the root portion to the tip portion and in a flow-wise direction between the leading edge and the trailing edge, and a throat line extending spanwise along the suction side surface from the root portion to the tip portion. The turbine airfoil further includes a plurality of micro-riblet patches defined along the suction side surface aft of the throat line where each micro-riblet patch of the plurality of micro-riblet patches extends in the flow-wise direction between the throat line and the trailing edge.

16 Claims, 12 Drawing Sheets

SUCTION SIDE MICRO-RIBLET PATCHES FOR A TURBINE AIRFOIL

FIELD

The present disclosure relates to a turbine airfoil of a gas turbine engine. More particularly, this disclosure is directed to a turbine airfoil having micro-riblet patches disposed along a suction side surface of the turbine airfoil.

BACKGROUND

Turbine airfoils, such as a turbine blade or stator vane, generally include a curved, concave surface, commonly referred to as the "pressure side" of the turbine airfoil, and a curved, convex surface commonly referred to as the "suction side" of the turbine airfoil. In operation, static nozzle segments direct the flow of a working fluid onto the pressure sides of circumferentially adjacent turbine airfoils connected to a rotor shaft causing the rotor shaft to rotate. As the working fluid flows across and between the adjacent turbine airfoils, a low-pressure region forms over the suction side of each turbine airfoil, and a high-pressure region forms over the pressure side of each adjacent turbine airfoil due to local flow accelerations. As the working fluid flows between the adjacent turbine airfoils, particularly across the suction side of the turbine airfoils, turbulent energy transfer between different flow layers of the working fluid results in skin or surface friction losses.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
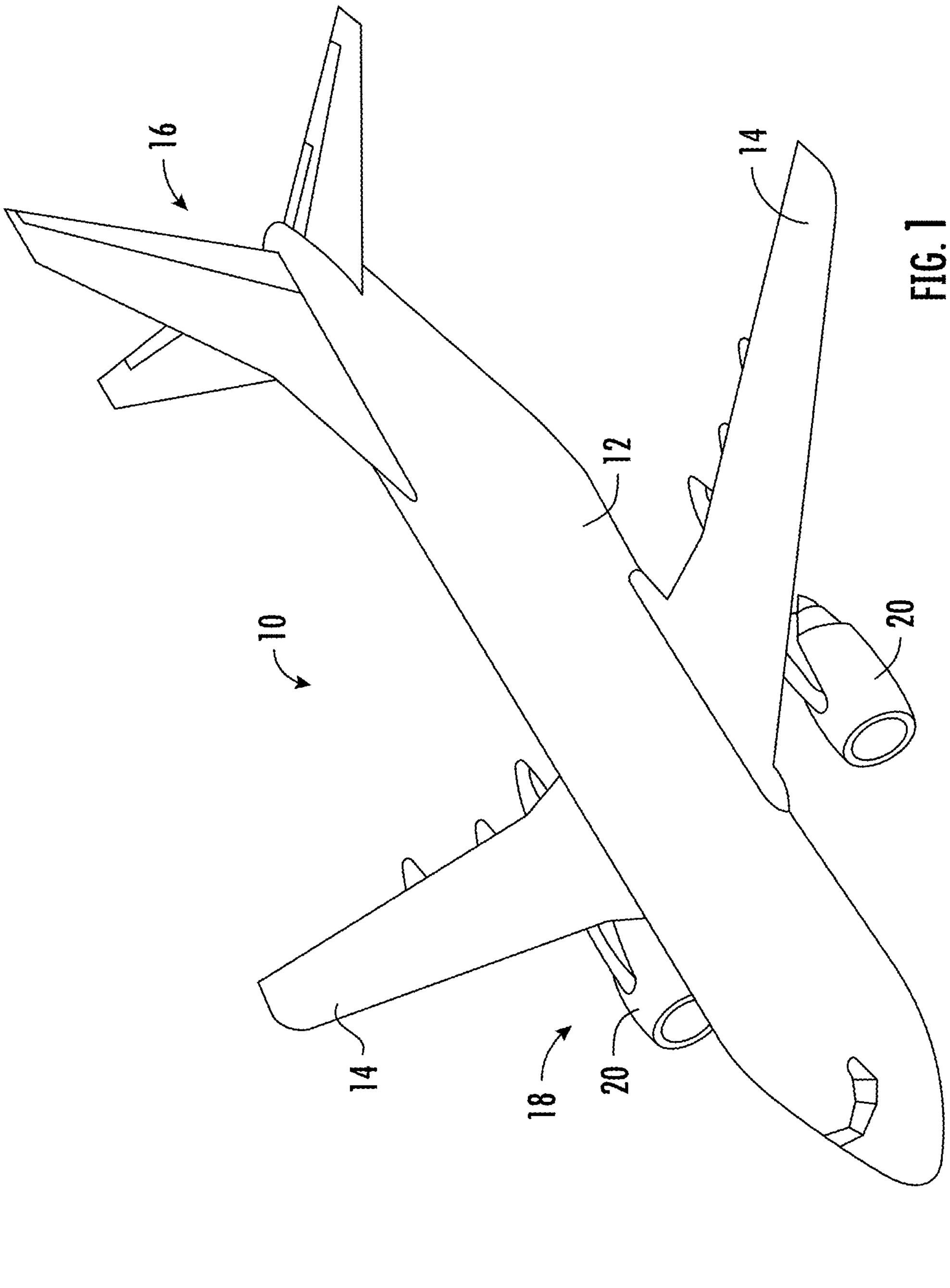
FIG. 1 is a perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet and aft refers to a position closer to an engine nozzle or exhaust.

Turbulent exchange happens as high-speed flow approaches or sweeps the suction side surface of an airfoil and as low momentum flow, within the boundary layer, moves away or is ejected from the zones nearer to the suction side surface of the airfoil. The various embodiments illustrated and described herein provide for riblets arranged in micro-riblet patches across a suction side surface of a turbine airfoil to reduce or mitigate friction losses, particularly aft of a throat of the airfoil. The micro-riblet patches as provided herein may reduce skin friction losses on the suction side surface of the airfoil by 5-15% by hampering turbulent energy transfer between flow layers.

The micro-riblet patches provided herein may be positioned in areas or specific locations along the suction side of the airfoil aft of the throat where the boundary layer is typically turbulent. The orientation, relative location, and number of micro-riblet patches serve to disengage turbulent vortices from interacting with the airfoil surface to minimize friction and to inhibit the interaction of multiple turbulent vortices with the airfoil surface. The length, height, axial variation of height, and orientation of the riblets with respect to localized flow conditions or dynamics will advantageously modulate friction within the boundary layer.

In certain embodiments, the individual riblets of each micro-riblet patch may be formed as micro-riblets with simplistic 2D profiles, positioned strategically at or aft of the throat to obstruct turbulent vortices from airfoil surface interaction. In addition, or in the alternative, the individual riblets of each micro-riblet patch may be formed as denticles or denticled riblets.

Referring now to the drawings, FIG. 1 is a perspective view of an aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wings 14, in other embodiments it may additionally or alternatively include one or more aspects coupled to other parts of the aircraft 10, such as, for example, the empennage 16, the fuselage 12, or both.

The propulsion system 18 includes at least one engine. In the exemplary embodiment shown, the aircraft 10 includes a pair of gas turbine engines 20. Each gas turbine engine 20 is mounted to aircraft 10 in an under-wing configuration. Each gas turbine engine 20 is capable of selectively generating propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
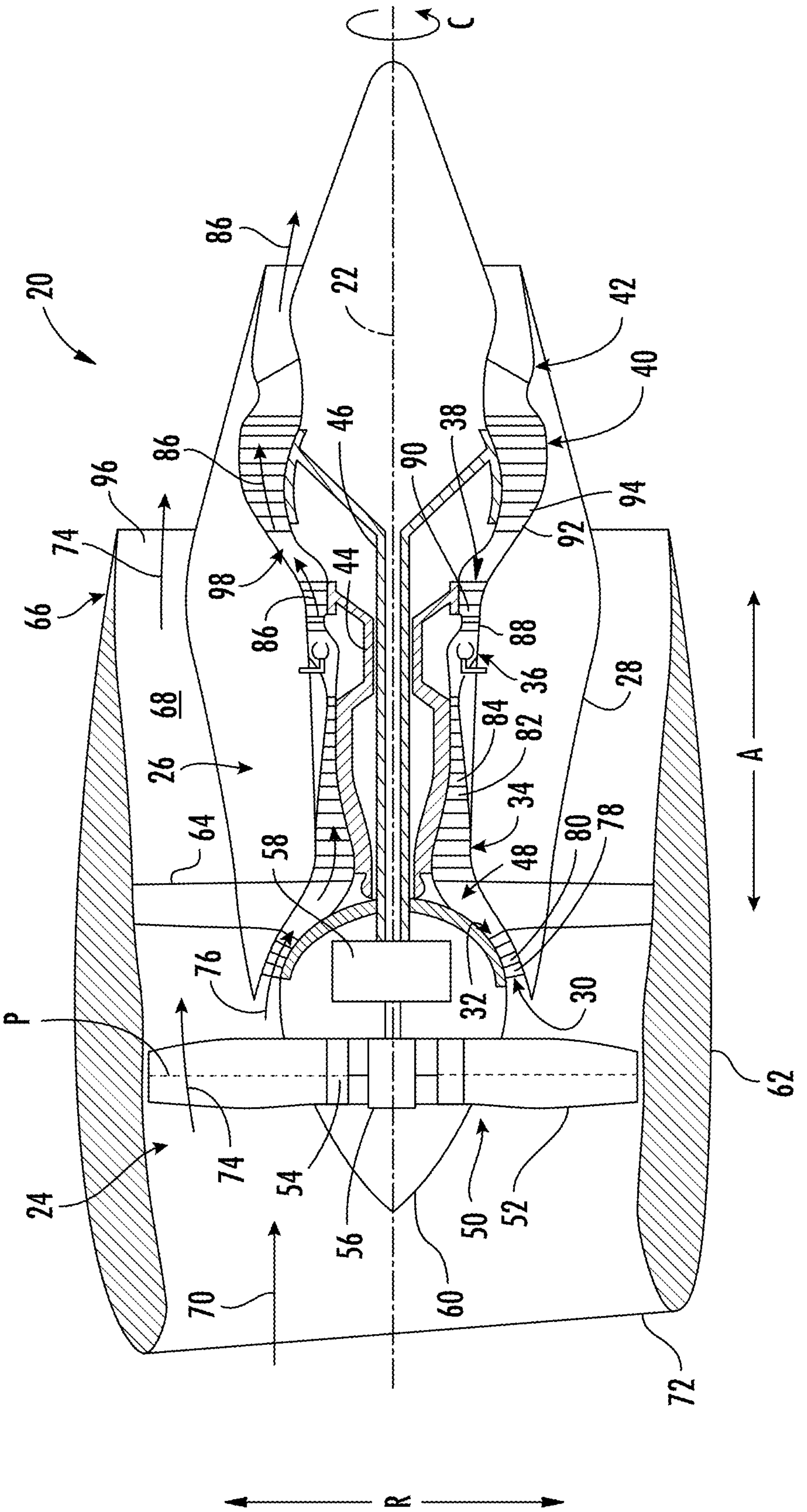
FIG. 2 is a cross-sectional schematic view of a gas turbine engine in accordance with an exemplary aspect of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The turbomachine 26 depicted generally includes an outer casing 28 that defines an annular core inlet 30. The outer casing 28 at least partially encases, in serial flow relationship, an axial compressor section including a booster or low-pressure compressor 32 and a high-pressure compressor 34, a combustion section 36, a turbine section including a high-pressure turbine 38, a low-pressure turbine 40, and a jet exhaust nozzle 42.

A high-pressure shaft 44 drivingly connects the high-pressure turbine 38 to the high-pressure compressor 34. A low-pressure shaft 46 drivingly connects the low-pressure turbine 40 to the low-pressure compressor 32. The low-pressure compressor 32, the high-pressure compressor 34, the combustion section 36, the high-pressure turbine 38, the low-pressure turbine 40, and the jet exhaust nozzle 42 together define a working gas flow path 48 through the gas turbine engine 20.

For the embodiment depicted, fan section 24 includes a fan 50 having a plurality of fan blades 52 coupled to a disk 54 in a circumferentially spaced apart manner. As depicted, the fan blades 52 extend outwardly from disk 54 generally along the radial direction R. Each fan blade 52 is about a pitch axis P by virtue of the fan blades 52 being operatively coupled to a pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the low-pressure shaft 46 across the power gear box 58. The power gear box 58 includes a plurality of gears for adjusting the rotational speed of the fan 50 relative to a rotational speed of the low-pressure shaft 46, such that the fan 50 and the low-pressure shaft 46 may rotate at more efficient relative speeds.

Referring still to the exemplary embodiment of FIG. 2, the disk 54 is covered by rotatable front hub 60 of the fan section 24 (sometimes also referred to as a "spinner"). The front hub 60 is aerodynamically contoured to promote airflow through the plurality of fan blades 52. Additionally, the fan section 24 includes an annular fan casing or outer nacelle 62 that circumferentially surrounds the fan 50 and/or at least a portion of the turbomachine 26. The outer nacelle 62 is supported relative to the turbomachine 26 by a plurality of circumferentially spaced struts or outlet guide vanes 64 in the embodiment depicted. Moreover, a downstream section 66 of the outer nacelle 62 extends over an outer portion of the turbomachine 26 to define a bypass airflow passage 68 therebetween.

It should be appreciated, however, that the gas turbine engine 20 depicted in FIG. 2 is provided by way of example only, and that in other exemplary embodiments, the gas turbine engine 20 may have other configurations. For example, although the gas turbine engine 20 depicted is configured as a ducted gas turbine engine (i.e., including the outer nacelle 62), in other embodiments, the gas turbine engine 20 may be an unducted or non-ducted gas turbine engine (such that the fan 50 is an unducted fan, and the outlet guide vanes 64 are cantilevered from the outer casing 28). It should also be appreciated that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the outer nacelle 62 and fan section 24. As the volume of air 70 passes across the fan blades 52, a first portion of air 74 is directed or routed into the bypass airflow passage 68 and a second portion of air 76 is directed or routed into the working gas flow path 48, or more specifically into the low-pressure compressor 32. The ratio between the first portion of air 74 and the second portion of air 76 is commonly known as a bypass ratio.

As the second portion of air 76 enters the low-pressure compressor 32, one or more sequential stages of low-pressure compressor stator vanes 78 and low-pressure compressor rotor blades 80 coupled to the low-pressure shaft 46, progressively compress the second portion of air 76 flowing through the low-pressure compressor 32 enroute to the high-pressure compressor 34. Next, one or more sequential stages of high-pressure compressor stator vanes 82 and high-pressure compressor rotor blades 84 coupled to the high-pressure shaft 44 further compress the second portion of air 76 flowing through the high-pressure compressor 34. This provides compressed air to combustion section 36 where it mixes with fuel and burns to provide combustion gases 86.

The combustion gases 86 are routed through the high-pressure turbine 38 where a portion of thermal and/or kinetic energy from the combustion gases 86 is extracted via sequential stages of high-pressure turbine stator vanes 88 that are coupled to a turbine casing and high-pressure turbine rotor blades 90 that are coupled to the high-pressure shaft 44, thus causing the high-pressure shaft 44 to rotate, thereby supporting operation of the high-pressure compressor 34. The combustion gases 86 are then routed through the low-pressure turbine 40 where a second portion of thermal and kinetic energy is extracted from the combustion gases 86 via sequential stages of low-pressure turbine stator vanes 92 that are coupled to a turbine casing and low-pressure turbine rotor blades 94 that are coupled to the low-pressure shaft 46, thus causing the low-pressure shaft 46 to rotate, and thereby supporting operation of the low-pressure compressor 32 and/or rotation of the fan 50.

Combustion gases 86 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 96 of the gas turbine engine 20, also providing propulsive thrust. The high-pressure turbine 38, the low-pressure turbine 40, and the jet exhaust nozzle 42 at least partially define a hot gas path 98 for routing the combustion gases 86 through the turbomachine 26.

Figure 3:
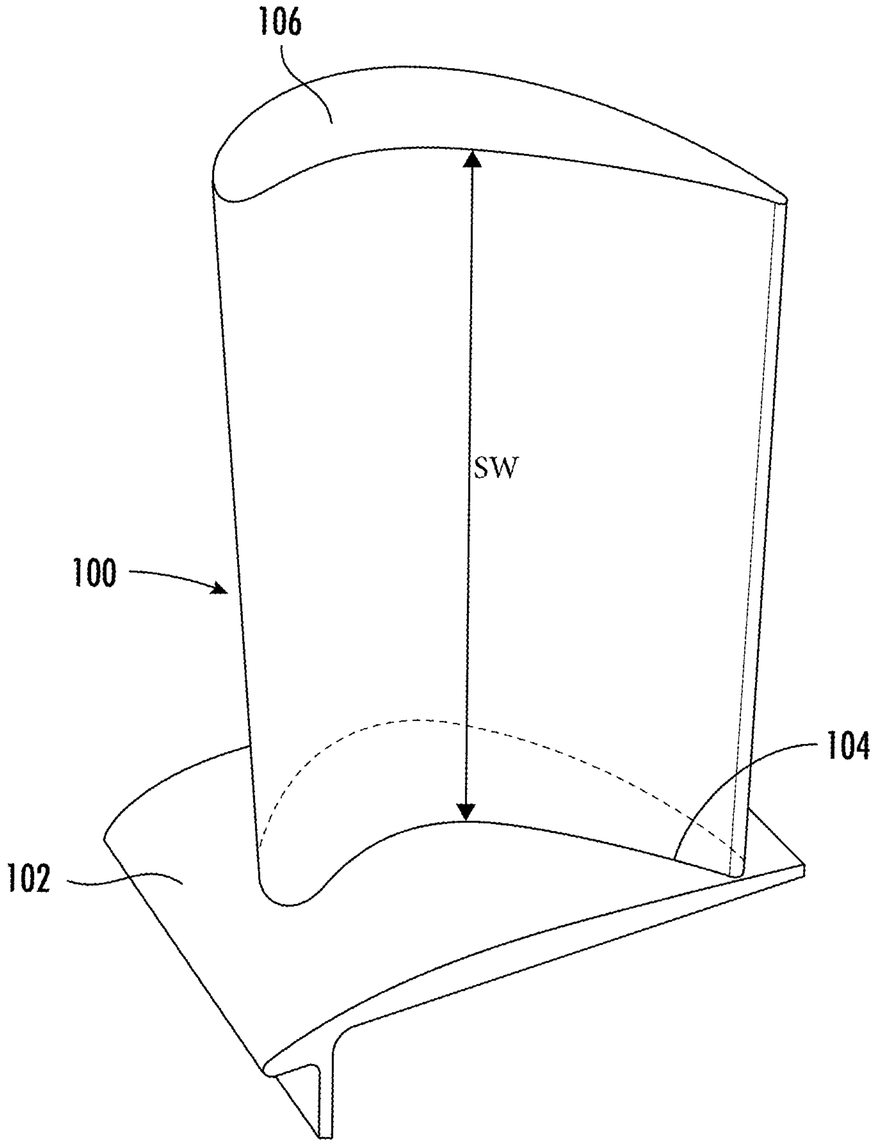
FIG. 3 is a perspective view of an exemplary turbine airfoil according to the present disclosure.

FIG. 3 is perspective view of an exemplary turbine airfoil 100 according to exemplary embodiments of the present disclosure. It is to be appreciated that the turbine airfoil 100 shown in FIG. 3 may be representative of any of the high-pressure turbine stator vane 88, the high-pressure turbine rotor blade 90, the low-pressure turbine stator vane 92 or the low-pressure turbine rotor blade 94 of the gas turbine engine 20 as shown in FIG. 2. As shown in FIG. 3, the turbine airfoil 100 may be attached to or formed with a shroud or platform portion 102. The turbine airfoil 100 extends in a spanwise direction (SW) which is generally parallel to radial direction R (FIG. 2) from a root portion 104 to a tip portion 106 of the turbine airfoil 100. The root portion 104 may be generally defined where the turbine airfoil 100 intersects with or is joined to the shroud or platform portion 102. In certain embodiments, wherein the turbine airfoil 100 is representative of a stator vane, the turbine airfoil 100 may include an outer platform or shroud (not shown for clarity) which is coupled to the turbine airfoil 100 at the tip portion 106. In certain embodiments, wherein the turbine airfoil 100 is representative of a rotor blade, the turbine airfoil 100 may include an outer platform or shroud (not shown for clarity) which is coupled to the turbine airfoil 100 at the tip portion 106.

Figure 4:
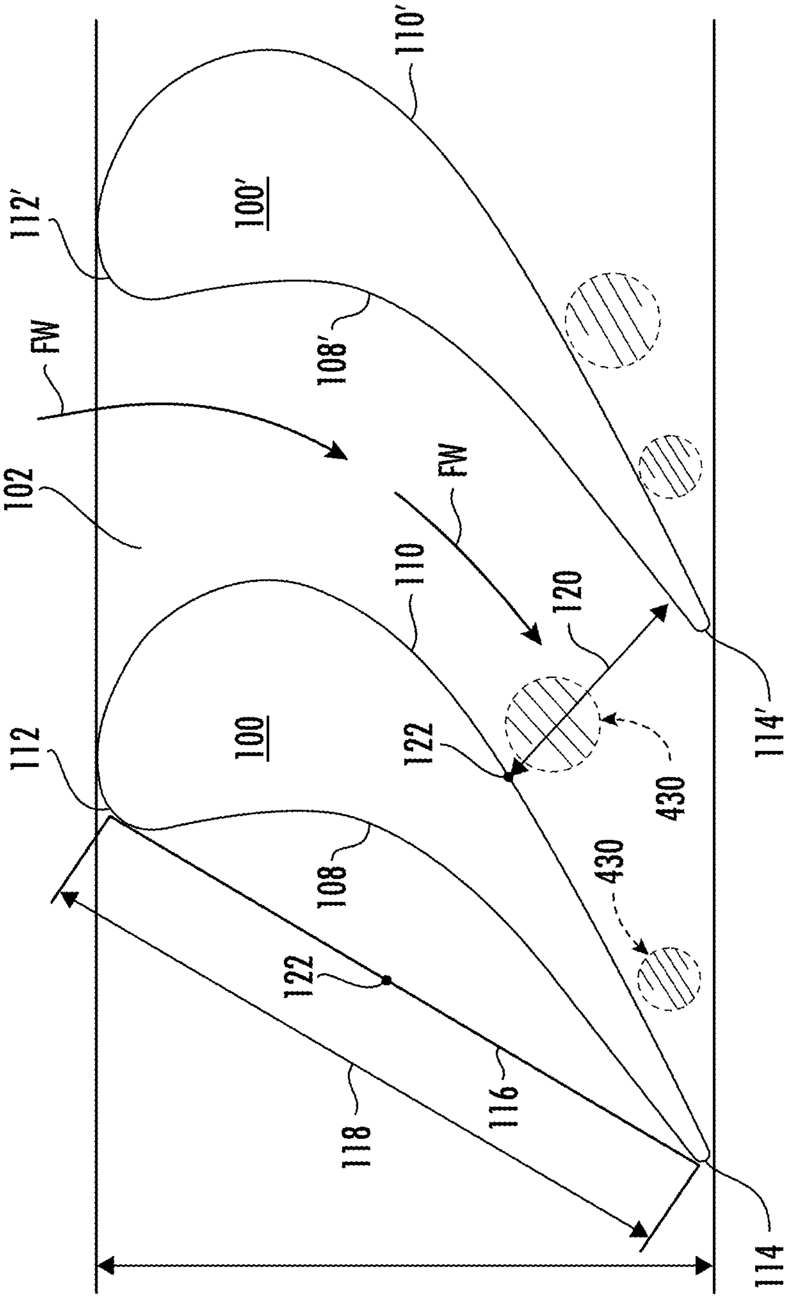
FIG. 4 is a schematic top view of the airfoil as shown in FIG. 3 with a second, circumferentially adjacent turbine airfoil, according to exemplary embodiments of the present disclosure.

FIG. 4 is a schematic top view of the turbine airfoil 100 as shown in FIG. 3 with a second turbine airfoil 100, circumferentially adjacent to the first turbine airfoil 100, according to exemplary embodiments of the present disclosure. As shown in FIG. 4, turbine airfoils 100, 100' each have a concave shaped pressure sidewall 108, 108' and a convex-shaped suction sidewall 110, 110' which are joined together at respective leading edge 112, 112' and trailing edge 114, 114: It is to be appreciated that although only two airfoils are illustrated, there could be any number of airfoils arranged next to each other and spaced circumferentially around the centerline As shown in FIG. 4, turbine airfoil 100 defines a chord line 116. The chord line 116 is an imaginary straight line joining the leading edge 112 and the trailing edge 114 of the turbine airfoil 100. Chord length 118 is the distance between the trailing edge 114 and a point on the leading edge 112 (generally a surface point of minimum radius) where the chord line 116 intersects the leading edge 112.

As shown in FIG. 4, the trailing edge 114' of the concave shaped pressure sidewall 108' of turbine airfoil 100' forms a throat 120 of minimum flow area between the concave shaped pressure sidewall 108' of turbine airfoil 100' and the suction sidewall 110 of turbine airfoil 100. In various embodiments, the throat 120 may be defined near or proximate to a mid-chord point 122 of the chord line 116 along the suction sidewall 110 of turbine airfoil 100.

Figure 5:
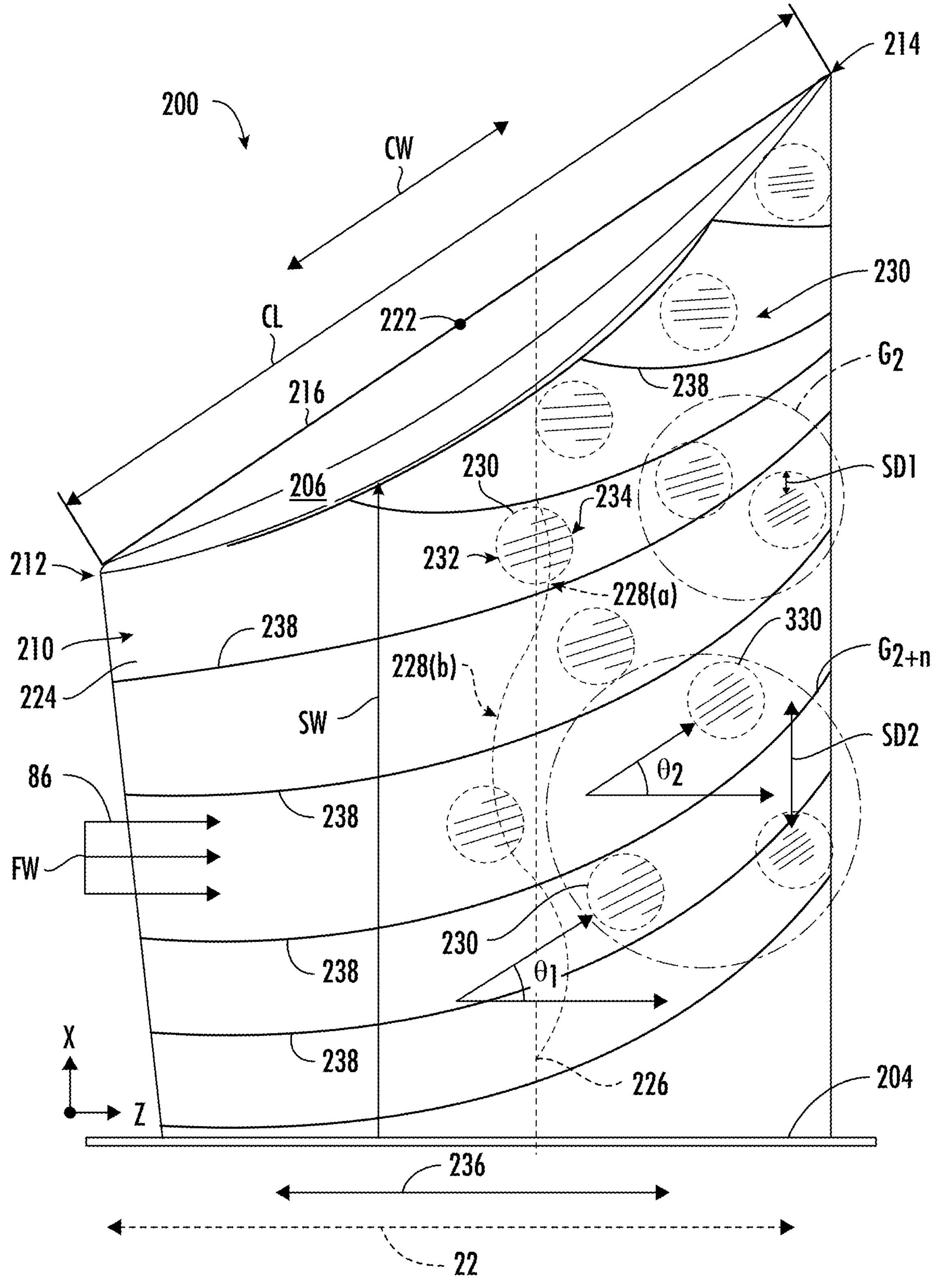
FIG. 5 is a side view of a suction sidewall of an exemplary airfoil of a turbine airfoil according to embodiments of the present disclosure.

FIG. 5 is a side view of a suction sidewall 210 of an exemplary turbine airfoil 200 according to exemplary embodiments of the present disclosure. It is to be appreciated that turbine airfoil 200 may be exemplary of turbine airfoils 100, 100' as shown in FIGS. 3 and 4 collectively. It is also to be appreciated that the turbine airfoil 200 shown in FIG. 5 may be representative of any of the high-pressure turbine stator vane 88, the high-pressure turbine rotor blade 90, the low-pressure turbine stator vane 92 or the low-pressure turbine rotor blade 94 of the gas turbine engine 20 as shown in FIG. 2.

As shown in FIG. 5, the turbine airfoil 200 defines a leading edge 212, a trailing edge 214, a root portion 204, a tip portion 206, and a chord line 216 defining a chord length ($C_L$) of the turbine airfoil 200. A suction sidewall 210 defines a suction side surface 224 or "wall" extending in spanwise direction (SW) from the root portion 204 to the tip portion 206, and in chordwise direction (CW) between the leading edge 212 and the trailing edge 214. A throat line 226 is defined along the suction side surface 224 extending from the root portion 204 to the tip portion 206.

Referring to FIGS. 4 and 5 collectively, the throat line 226 is defined along the suction side surface 224 at the throat 120 (FIG. 4) or minimum flow area. The throat line 226 may be curved between the root portion 204 and the tip portion 206. For example, certain portions 228(*a*) of the throat line 226 may be closer to the trailing edge 214 than other portions 228(*b*) of the throat line 226 as the throat line 226 extends between the root portion 204 and the tip portion 206.

In exemplary embodiments, as shown in FIG. 5, the turbine airfoil 200 defines a plurality of micro-riblet patches 230 defined along the suction side surface 224 at or aft of the throat line 226. Each micro-riblet patch 230 of the plurality of micro-riblet patches 230 extends generally in a flow-wise direction (FW). In particular embodiments, at least one micro-riblet patch 230 may be disposed along the suction side surface 224 along or forward of the throat line 226. In other exemplary embodiments, there may be zero micro-riblet patches 230 positioned forward of the throat 120 or throat line 226.

In exemplary embodiments, as shown in FIG. 5, the plurality of micro-riblet patches 230 may be arranged in two or more groups ($G_2$, $G_{2+1}$) with each group $G_2$, $G_{2+n}$ including two or more micro-riblet patches 230 disposed across the suction side surface 224 aft of the throat line 226. Referring briefly to FIG. 4, in exemplary embodiments, one or more micro-riblet patches 430 may be defined along the shroud or platform portion 102 of the turbine airfoil 100 at or aft of the throat 120.

As shown in FIG. 5, each micro-riblet patch 230 generally includes an upstream end 232 and a downstream end 234 with respect to flow-wise direction (FW) of the combustion gases 86 flowing through the turbine section of the gas turbine engine 20 (FIG. 2). As shown in FIG. 5, each individual micro-riblet patch 230 of the plurality of micro-riblet patches 230 may be arranged or oriented at an angle (θ) relative to an axial centerline 236 of the turbine airfoil 200 or to the longitudinal centerline 22 of the gas turbine engine 20 (FIG. 2). For example, in particular embodiments, the plurality of micro-riblet patches 230 comprises a first micro-riblet patch 230 and a second micro-riblet patch 330. Micro-riblet patch 230 may be oriented at a first angle ($\theta_1$) relative to the axial centerline 236 of the turbine airfoil 200 or to the longitudinal centerline 22 of the gas turbine engine 20 (FIG. 2), and the second micro-riblet patch 330 is oriented at a second angle ($\theta_2$) relative to the axial centerline 236 of the turbine airfoil 200 or to the longitudinal centerline 22 of the gas turbine engine 20 (FIG. 2). The first angle $\theta_1$ may be greater than or less than the second angle $\theta_2$. In exemplary embodiments, angles $\theta_1$, $\theta_2$ of the micro-riblet patches 230, 330 are aligned with gas flow streamlines 238 that occur across the suction side surface 224 of the turbine airfoil 200 during various operating conditions of the gas turbine engine 20, thus optimizing each of the first micro-riblet patch 230 and the second micro-riblet 330 to a local flow condition along the suction side surface 224 at particular operating conditions of the gas turbine engine 20. It is to be appreciated that the gas flow streamlines 238 vary in spanwise position, chord length, and general shape across the suction side surface 224 as the gas turbine engine transitions between operating states which effect airflow across the respective airfoils.

Figure 6:
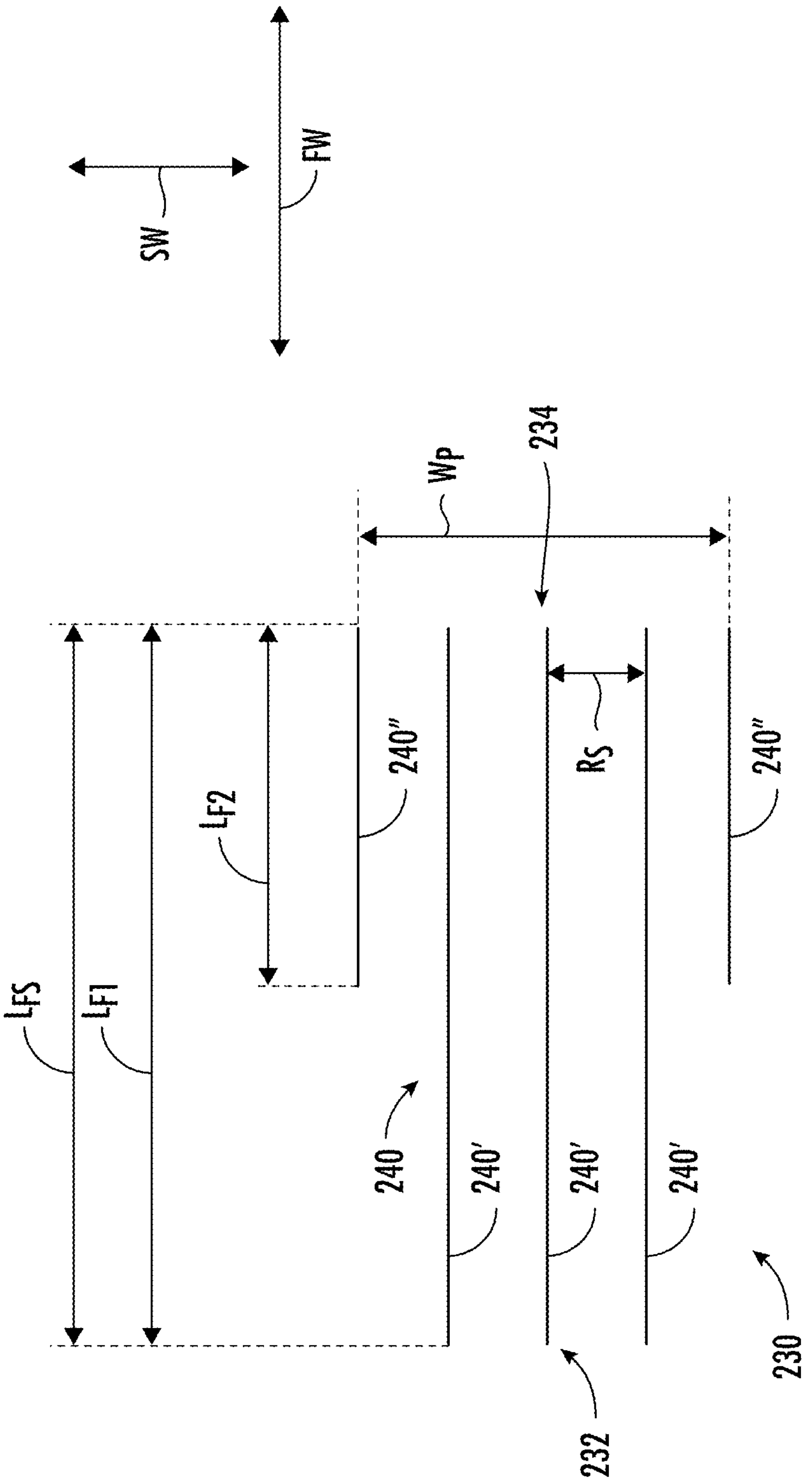
FIG. 6 provides a schematic view of an exemplary micro-riblet patch of a plurality of micro-riblet patches as shown in FIG. 5, according to an exemplary embodiment of the present disclosure.

FIG. 6 provides a schematic view of an exemplary micro-riblet patch 230 of the plurality of micro-riblet patches 230 as shown in FIG. 5, according to an exemplary embodiment of the present disclosure. As shown in FIG. 6, each micro-riblet patch 230 of the plurality of micro-riblet patches 230 comprises a plurality of riblets 240 radially spaced with respect to the spanwise direction SW and extending in parallel to one another between the upstream end 232 and the downstream end 234 of the respective micro-riblet patch 230.

In an exemplary embodiment, as shown in FIG. 6, at least one micro-riblet patch 230 of the plurality of micro-riblet patches 230 includes at least one or more inner riblets 240'(three inner riblets 240' shown) extending a first flow-wise length ($L_{F1}$) as measure from the upstream end 232 to the downstream end 234 of the respective micro-riblet patch 230. The micro-riblet patch 230 further includes two outer riblets 240' extending at a second flow-wise length ($L_{F2}$) as measured between the upstream end 232 and the downstream end 234 of the respective micro-riblet patch 230. In the exemplary embodiment shown, the first flow-wise length $L_{F1}$ of the inner riblets 240' is greater than the second flow-wise length $L_{F2}$ of the outer riblets 240' The inner riblets 240' are disposed in the spanwise direction SW between the outer riblets 240' The micro-riblet patch 230 has an overall patch width ($W_P$) defined as a spanwise distance between the two outer riblets 240" measured in the spanwise direction SW. Spanwise spacing ($R_S$) between adjacent riblets 240', 240" of the micro-riblet patch 230 may be uniform or may be varied. An exemplary riblet 230 may be formed integral to or applied to the suction side surface 234. Exemplary riblets 230 may be formed as 2D or 3D protrusions extending outwardly from the suction side surface 234.

As shown in FIG. 6, the micro-riblet patch 230 has an overall micro-riblet patch length ($L_{FS}$) which may be described as the maximum distance between the upstream end 232 and the downstream end 234 of the micro-riblet patch 230. In certain embodiments, the overall micro-riblet patch length $L_{FS}$ is equal to the first flow-wise length $L_{F1}$ of the inner riblets 240: In exemplary embodiments, the overall micro-riblet patch length $L_{FS}$ may be related to the chord length $C_L$ of the turbine airfoil 200. For example, in exemplary embodiments, the overall micro-riblet patch length $L_{FS}$ may be in a range of 3 percent to 50 percent of the chord length $C_L$ of the turbine airfoil 200. Micro-riblet patch length $L_{FS}$ in a range of 3 percent to 50 percent of the chord length $C_L$ of the turbine airfoil 200 have been shown to advantageously modulate friction within the boundary layer formed along the suction side 234 of the airfoil 200.

Figure 7:
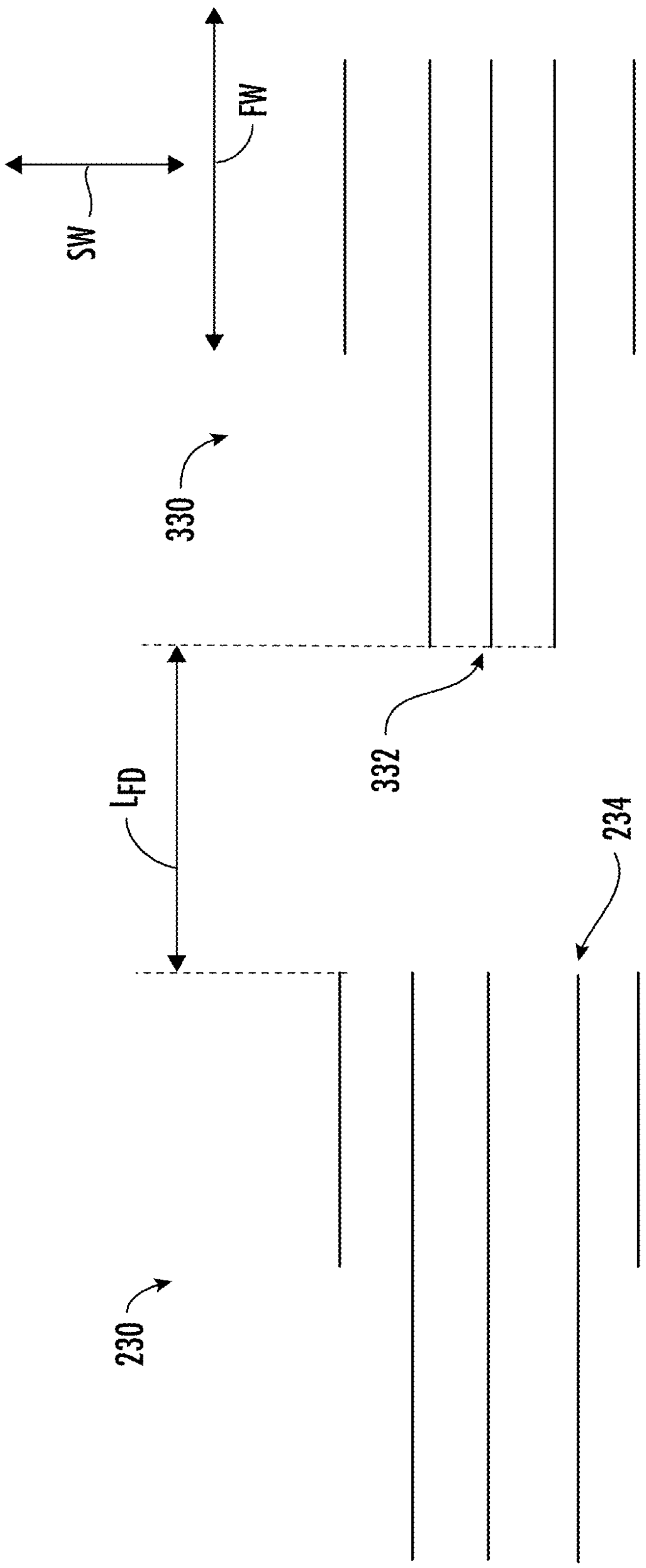
FIG. 7 provides a schematic view of two adjacent micro-riblet patches including a first micro-riblet patch and a second micro-riblet patch of the plurality of micro-riblet patches shown in FIG. 5, according to particular embodiments of the present disclosure.

FIG. 7 provides a schematic view of two micro-riblet patches 230, 330 of the plurality of micro-riblet patches 230 including micro-riblet patch 230 and second micro-riblet patch 330 positioned immediately adjacent one another with respect to the flow-wise direction FW, according to particular embodiments of the present disclosure. It is to be appreciated that this is an example arrangement between two micro-riblet patches. Other micro-riblet patches of the micro-riblet patches shown in FIG. 5 can be similarly arranged. As shown in FIG. 7, micro-riblet patch 230 and micro-riblet patch 330 may be substantially aligned in the spanwise direction SW but spaced apart or offset in the flow-wise direction FW by flow-wise distance ($L_{FD}$). The flow-wise distance $L_{FD}$ may be measured between the downstream end 234 of micro-riblet patch 230 and an upstream end 332 of the second micro-riblet patch 330. In various embodiments, the flow-wise distance $L_{FD}$ may be in the range of $-3\% \leq CL \leq 10\%$ of the chord length $C_L$ of the turbine airfoil 200. It is to be noted that when the flow-wise distance $L_{FD}$ is less than zero, the micro-riblet patches overlap in the spanwise direction SW. When the flow-wise distance $L_{FD}$ is greater than zero, the micro-riblet patches do not overlap in the spanwise direction SW.

Figure 8:
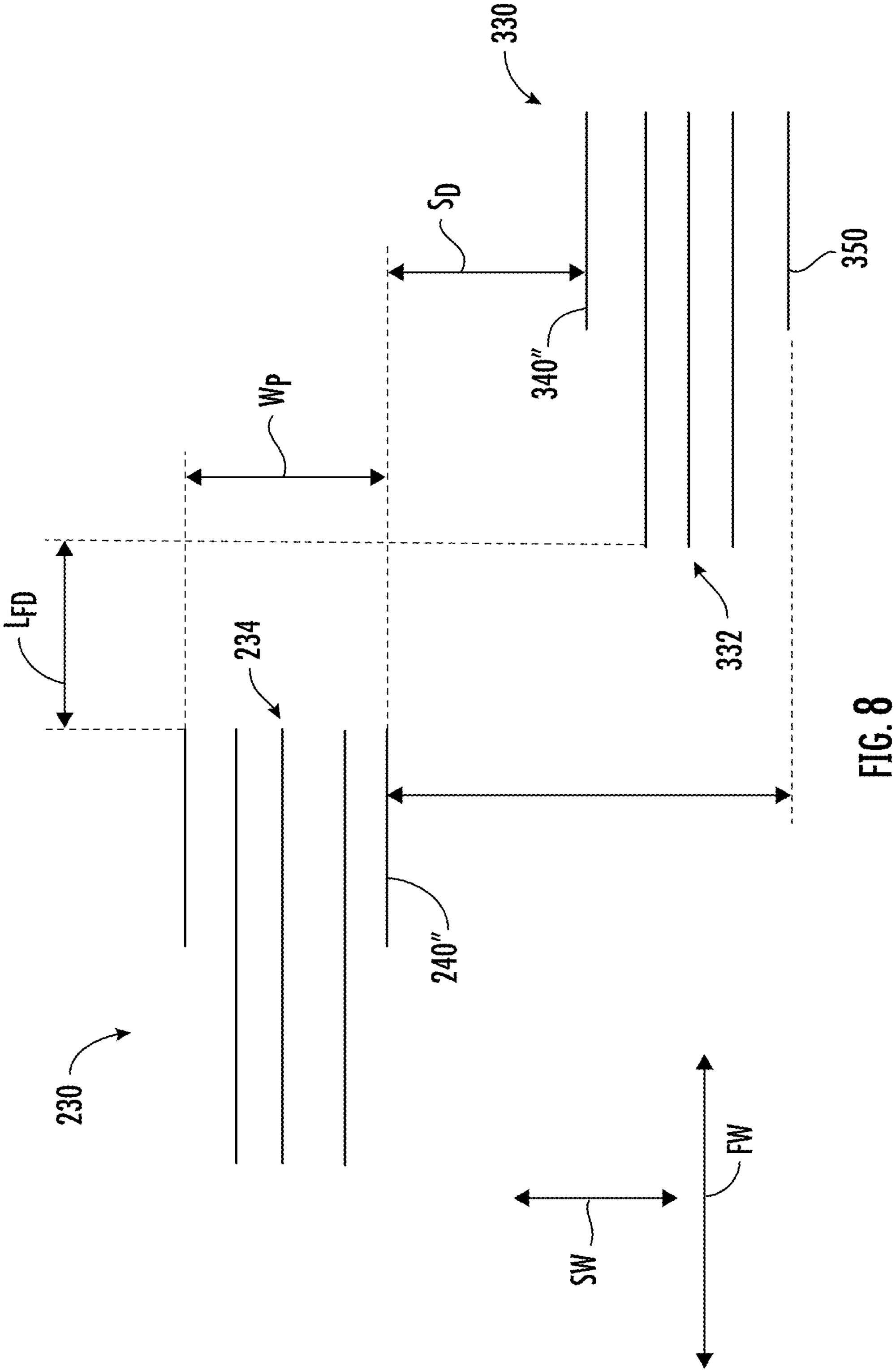
FIG. 8 provides a schematic view of adjacent micro-riblet patches including a first micro-riblet patch and a second micro-riblet patch, according to embodiments of the present disclosure.
Figure 9:
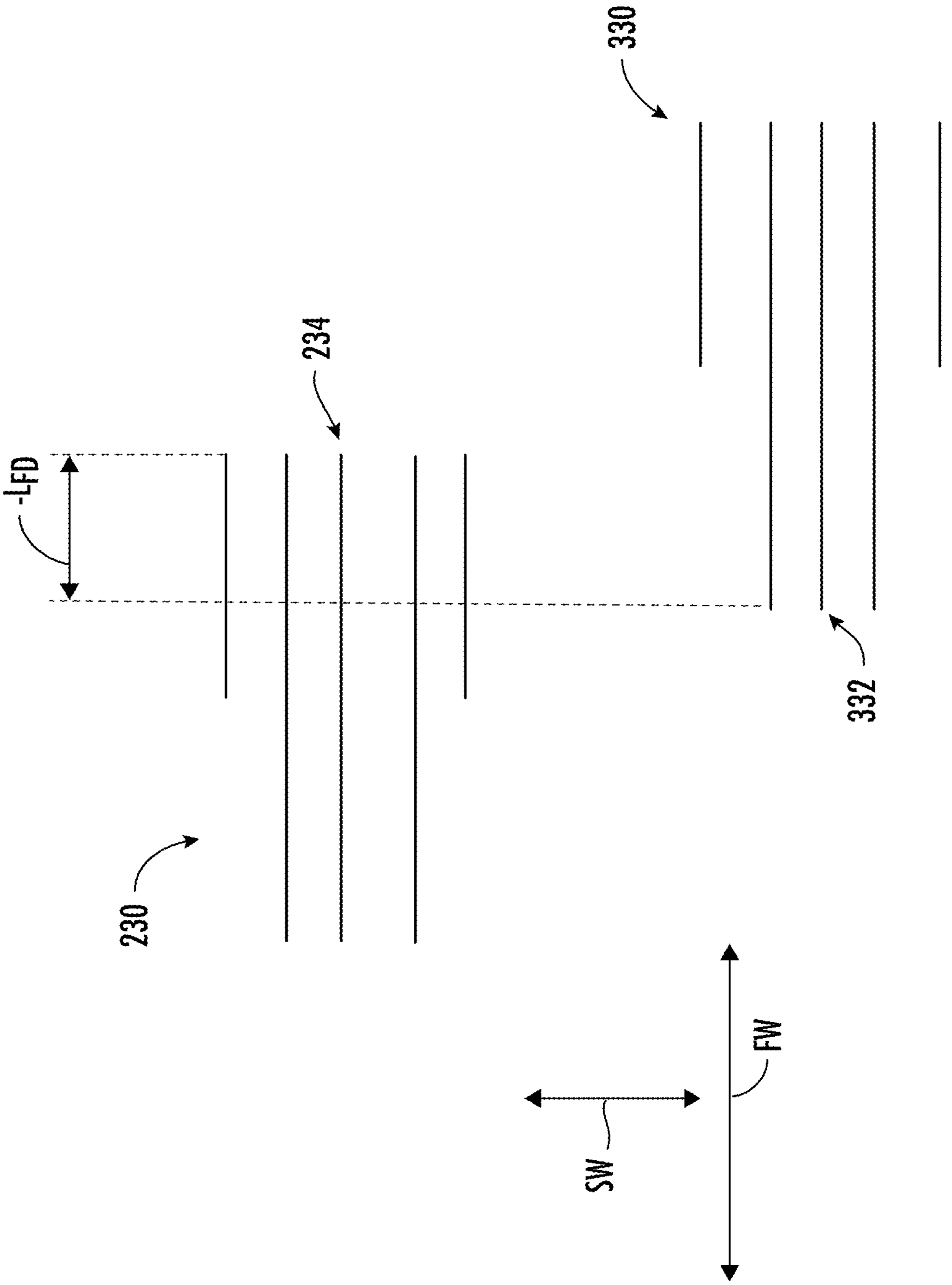
FIG. 9 provides a schematic view of adjacent micro-riblet patches including a first micro-riblet patch and a second micro-riblet patch, according to embodiments of the present disclosure.

FIGS. 8 and 9 provide schematic views of adjacent micro-riblet patch 230 and second micro-riblet patch 330, according to embodiments of the present disclosure. It is to be appreciated that this is an example arrangement between two adjacent micro-riblet patches. Other adjacent micro-riblet patches of the micro-riblet patches shown in FIG. 5 can be similarly arranged. As shown in FIGS. 8 and 9 collectively, micro-riblet patch 230 may be spaced apart or offset from the second micro-riblet patch 330 in both the flow-wise direction FW by flow-wise distance $L_{FD}$ and in the spanwise direction SW by a spanwise distance ($S_D$).

The spanwise distance $S_D$ may be measured as a distance between outer riblet 240" of micro-riblet patch 230 and outer riblet 340" of the second micro-riblet patch 330. In exemplary embodiments, the spanwise distance $S_D$ may be related to the overall micro-riblet patch width $W_P$. For example, the spanwise distance $S_D$ between adjacent micro-riblet patches 230 and 330 may be in a range of 0 to 1.5 percent of the overall micro-riblet patch width $W_P$ of the first micro-riblet patch 230. A tangential arrangement of the adjacent micro-riblet patches 230 and 330 may be in the range of −50% to 50% of the overall micro-riblet patch width $W_P$. The term "tangential arrangement" as used herein is defined as a spanwise distance between outer riblet 240" of micro-riblet patch 230 and an outer riblet 350 of the second micro-riblet patch 330. Outer riblet 350 is positioned closer to the root portion 204 of the turbine airfoil 200 as shown in FIG. 5, than outer riblet 240" (FIG. 8) of micro-riblet patch 230.

Referring briefly back to FIG. 5, in an exemplary embodiment, the micro-riblet patches 230 in the first group $G_2$ of micro-riblet patches 230 (FIG. 5) are spaced apart from one another at a first spanwise distance $S_{D1}$ and the micro-riblet patches 230 of the second group $G_{2+n}$ of micro-riblet patches 230 are spaced apart from one another at a second spanwise distance $S_{D2}$. In exemplary embodiments, the second spanwise distance $S_{D2}$ is 60 percent or less than the first spanwise distance $S_{DL}$. In exemplary embodiments, the second spanwise distance $S_{D2}$ may be between 60 percent and 100 percent of the first spanwise distance $S_{DL}$.

In exemplary embodiments, as shown in FIG. 8, first micro-riblet patch 230 and second micro-riblet patch 330 may be spaced apart or offset in the flow-wise direction FW such that the downstream end 234 of micro-riblet patch 230 is disposed upstream from the upstream end 332 of the second micro-riblet patch 330. In other embodiments, as shown in FIG. 9, micro-riblet patch 230 and second micro-riblet patch 330 may be spaced apart or offset in the flow-wise direction FW such that the upstream end 332 of the second micro-riblet patch 330 is disposed upstream from the downstream end 234 of the second micro-riblet patch 330 by a negative flow-wise distance ($-L_{FD}$). In other words, the first micro-riblet patch 230 overlaps in the flow-wise direction FW with at least a portion of the second micro-riblet patch 330. The flow-wise distance $L_{FD}$ may be related to the chord length $C_L$ of the turbine airfoil 200. For example, in particular embodiments flow-wise distance $L_{FD}$ may be in the range of −3% and 10% of the chord length $C_L$ of the turbine airfoil 200. Embodiments wherein the flow-wise distance $L_{FD}$ is in the range of −3% and 10% of the chord length $C_L$ of the turbine airfoil 200 have been shown to advantageously modulate friction within the boundary layer formed along the suction side 234 of the airfoil 200.

Figure 10A:
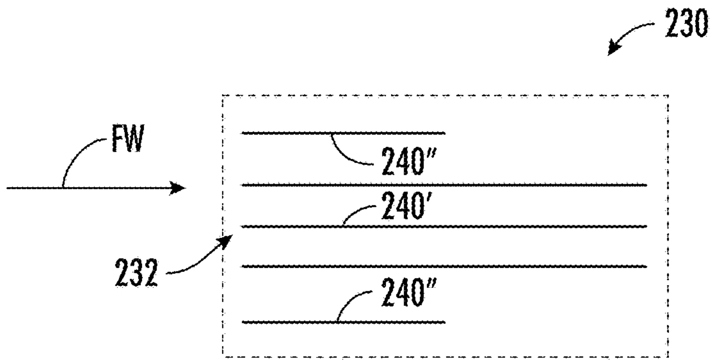
FIGS. 10A, 10B, 10C, and 10D provide various exemplary micro-riblet patch shapes or configurations according to various embodiments of the present disclosure.
Figure 10B:
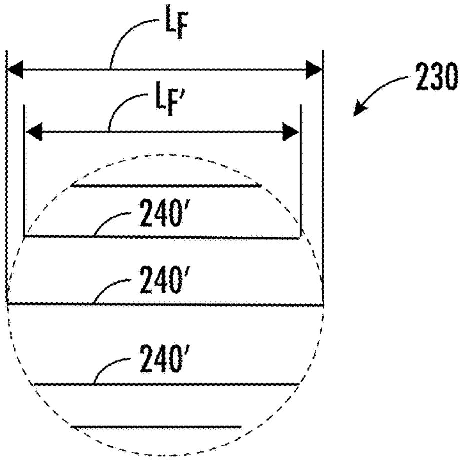
Figure 10C:
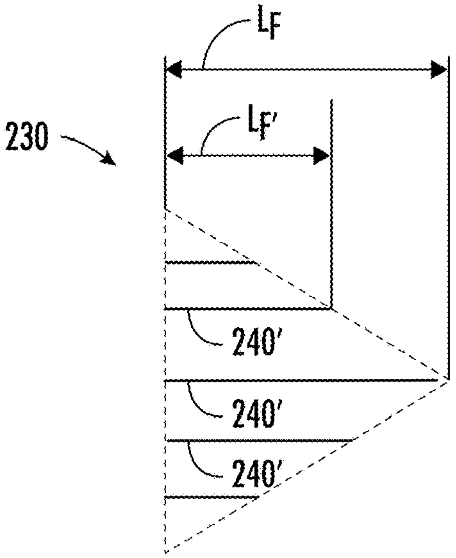
Figure 10D:
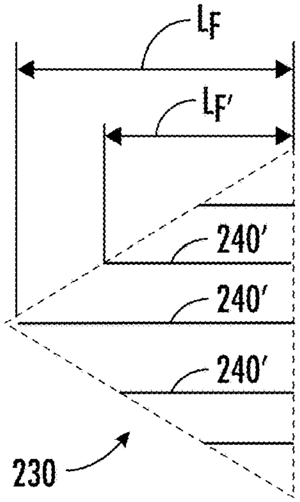

FIGS. 10A, 10B, 10C, and 10D provide various exemplary micro-riblet patch shapes or configurations according to various embodiments of the present disclosure. In one embodiment, as shown in FIG. 10A, the outer riblets 240" and the at least one inner riblet 240' extend from the upstream end 232 of the micro-riblet patch 230 with respect to flow-wise direction FW. In particular embodiments, as shown in FIGS. 10B, 10C, and 10D, the micro-riblet patch 230, particularly the at least one inner riblet 240, includes a plurality of inner riblets 240' having different flow-wise lengths $L_F$, $L_F$: It is to be appreciated that the length $L_C'$ of individual inner riblets 240' of the plurality of individual inner riblets 240' within a respective micro-riblet patch 230 may be different or vary with respect to one another.

Figure 11A:
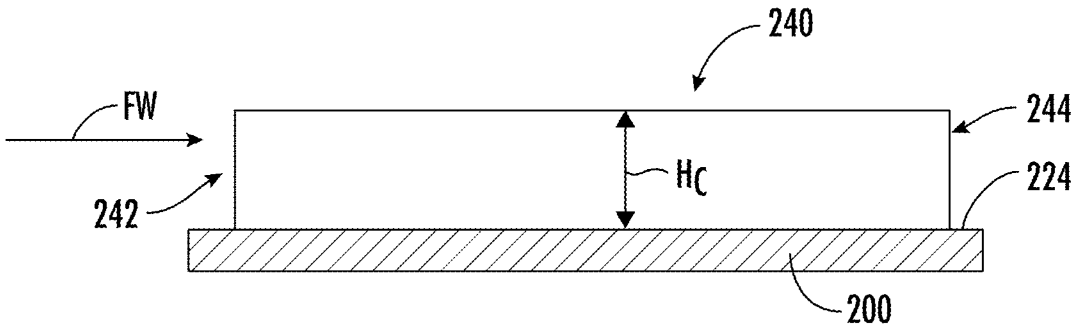
FIGS. 11A, 11B, and 11C provide side profile views of exemplary riblets 240 of the plurality of riblets 240 according to particular embodiments of the present disclosure.
Figure 11B:
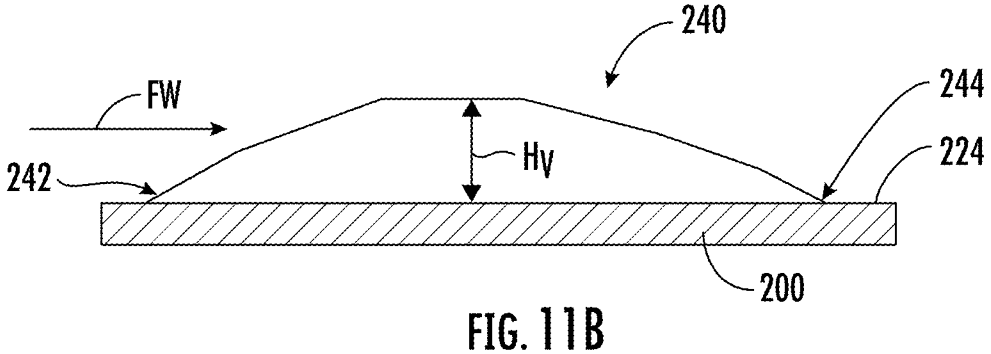
Figure 11C:
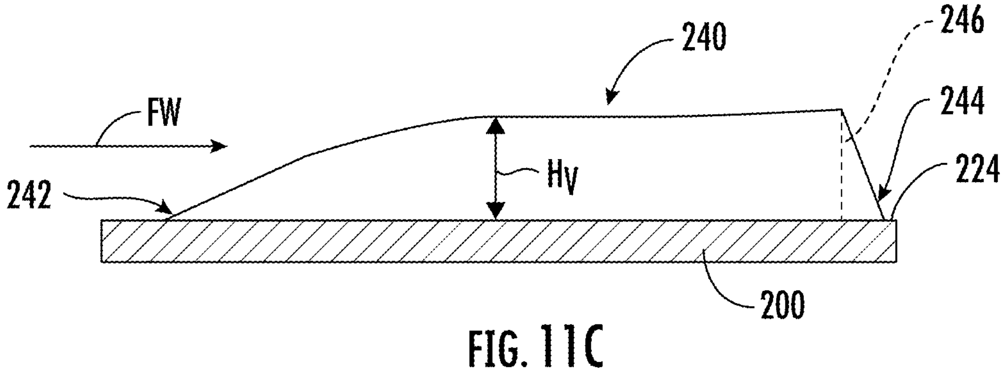

FIGS. 11(*a-c*) provide side profile views of exemplary riblets 240 of the plurality of riblets 240 according to particular embodiments of the present disclosure. The riblets 240 shown in FIGS. 11A-c may be representative of inner riblets 240 or outer riblets 240 of micro-riblet patches 230. As shown in FIGS. 11A-c, each riblet 240 has a height (H) as measured from the suction side surface 224 of the turbine airfoil 200. In one embodiment, as shown in FIG. 11A, riblet 240 may have a constant height ($H_C$) extending from a forward end 242 to an aft end 244 of the respective riblet 240. The forward end 242 is generally positioned upstream from the aft end 244 with respect to the flow-wise direction FW. In other embodiments, as shown in FIG. 11B, riblet 240 may have a curvilinear profile with a variable height ($H_V$) from the forward end 242 to the aft end 244 of the respective riblet 240. In other embodiments, as shown in FIG. 11C, a portion of riblet 240 may have a curvilinear profile with a variable height ($H_V$) from the forward end 242 and a truncated portion 246 defined at or proximate to the aft end 244.

Figure 12:
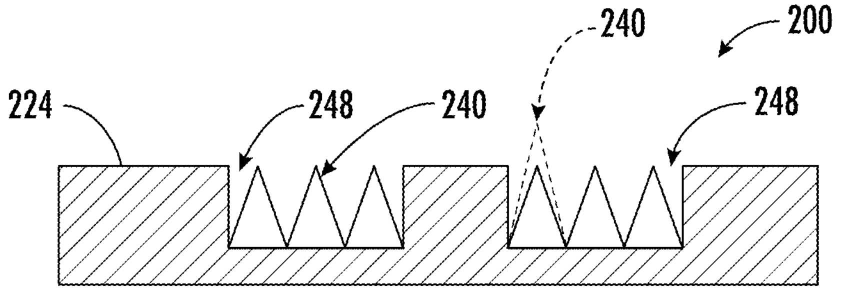
FIG. 12 provides a cross-sectional forward looking aft view of a portion of the turbine airfoil according to an embodiment of the disclosure.
Figure 13:
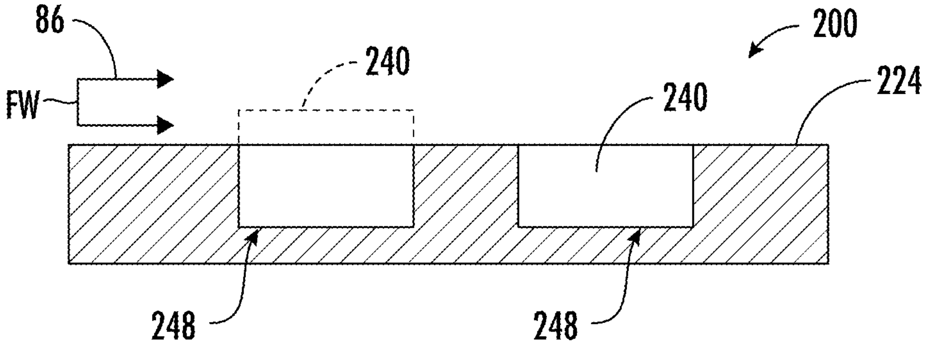
FIG. 13 provides a cross-sectional side view of a portion of the turbine airfoil as shown in FIG. 12, according to an exemplary embodiment of the disclosure.

FIG. 12 provides a cross-sectional forward looking aft view of a portion of the turbine airfoil 200 according to an embodiment of the disclosure. FIG. 13 provides a cross-sectional side view of a portion of the turbine airfoil 200 as shown in FIG. 12. In exemplary embodiments, as shown in FIGS. 12 and 13 collectively, one or more channels 248 are defined along the suction side surface 224 of the turbine airfoil 200. One or more riblets 240 may be disposed within the one or more channels 248 below the suction side surface 224. In exemplary embodiments, one or more riblets 240 may extend above the suction side surface 224.

Further aspects are provided by the subject matter of the following clauses:

A turbine airfoil, comprising: a leading edge, a trailing edge, a root portion, a tip portion, a chord line defining a chord length of the turbine airfoil, a suction side surface extending in a spanwise direction from the root portion to the tip portion and in a chordwise direction between the leading edge and the trailing edge, and a throat line extending spanwise along the suction side surface from the root portion to the tip portion; and a plurality of micro-riblet patches defined along the suction side surface aft of the throat line, wherein each micro-riblet patch of the plurality of micro-riblet patches extends in a flow-wise direction between the throat line and the trailing edge.

The turbine airfoil of the preceding or any following clause, wherein the plurality of micro-riblet patches includes a first micro-riblet patch and a second micro-riblet patch, wherein the first micro-riblet patch is offset from the second micro-riblet patch in at least one of the flow-wise direction and the spanwise direction of the airfoil.

The turbine airfoil of any preceding or following clause, wherein the plurality of micro-riblet patches comprises a first micro-riblet patch oriented at a first angle relative to an axial centerline of the turbine airfoil, and a second micro-riblet patch oriented at a second angle relative to the axial centerline of the turbine airfoil, wherein the first angle is greater than or less than the second angle.

The turbine airfoil of any preceding or following clause, wherein each micro-riblet patch of the plurality of micro-riblet patches comprises a plurality of riblets extending parallel to one another in the flow-wise direction.

The turbine airfoil of any preceding or following clause, wherein at least one micro-riblet patch of the plurality of micro-riblet patches includes at least one inner riblet extending at a first flow-wise length and at least two outer riblets extending at a second flow-wise length.

The turbine airfoil of any preceding or following clause, wherein the first flow-wise length is greater than the second flow-wise length.

The turbine airfoil of any preceding or following clause, wherein the first flow-wise length is less than the second flow-wise length.

The turbine airfoil of any preceding or following clause, wherein the first flow-wise length is between 3 percent and 50 percent of the chord length of the airfoil.

The turbine airfoil of any preceding or following clause, wherein the at least one inner riblet is disposed spanwise between the at least two outer riblets.

The turbine airfoil of any preceding or following clause, wherein the plurality of micro-riblet patches comprises a first micro-riblet patch having a downstream end and a second micro-riblet patch having an upstream end, wherein the downstream end of the first micro-riblet patch is offset in the flow-wise direction from the upstream end of the second micro-riblet patch.

The turbine airfoil of any preceding or following clause, wherein the downstream end of the first micro-riblet patch is offset from the upstream end of the second micro-riblet patch in the flow-wise direction by between −3 percent and 10 percent of the chord length of the airfoil.

The turbine airfoil of any preceding or following clause, wherein the plurality of micro-riblet patches further comprises at least one micro-riblet patch disposed along or forward of the throat line.

The turbine airfoil of any preceding or following clause, further comprising a platform, wherein the plurality of micro-riblet patches further comprises at least one micro-riblet patch disposed along the platform.

A gas turbine engine, comprising: a first turbine airfoil defining a pressure side surface; a second turbine airfoil defining a suction side surface, wherein the pressure side surface of the first turbine airfoil and the suction side surface of the second turbine airfoil define a flowpath therebetween, wherein a throat line is defined along the suction side surface, the suction side surface comprising; and a plurality of micro-riblet patches defined along the suction side surface aft of the throat line, wherein each micro-riblet patch of the plurality of micro-riblet patches extends in a flow-wise direction between the throat line and the trailing edge.

The gas turbine engine of the preceding or any following clause, wherein the plurality of micro-riblet patches includes a first micro-riblet patch and a second micro-riblet patch, wherein the first micro-riblet patch is offset from the second micro-riblet patch in at least one of the flow-wise direction and the spanwise direction of the airfoil.

The gas turbine engine of any preceding or following clause, wherein the plurality of micro-riblet patches comprises a first micro-riblet patch oriented at a first angle relative to an axial centerline of the turbine airfoil, and a second micro-riblet patch oriented at a second angle relative to the axial centerline of the turbine airfoil, wherein the first angle is greater than or less than the second angle.

The gas turbine engine of any preceding or following clause, wherein each micro-riblet patch of the plurality of micro-riblet patches comprises a plurality of riblets extending parallel to one another in the flow-wise direction.

The gas turbine engine of any preceding or following clause, wherein at least one micro-riblet patch of the plurality of micro-riblet patches includes at least two inner riblets extending at a first flow-wise length and at least two outer riblets extending at a second flow-wise length, wherein the first flow-wise length is greater than the second flow-wise length.

The gas turbine engine of any preceding or following clause, wherein the at least two inner riblets are disposed spanwise between the at least two outer riblets.

The gas turbine engine of any preceding or following clause, wherein the first flow-wise length is between 3 percent and 50 percent of the chord length of the airfoil.

The gas turbine engine of any preceding or following clause, wherein the plurality of micro-riblet patches comprises a first micro-riblet patch having a downstream end and a second micro-riblet patch having an upstream end, wherein the downstream end of the first micro-riblet patch is offset in the flow-wise direction from the upstream end of the second micro-riblet patch.

The gas turbine engine of any preceding or following clause, wherein the downstream end of the first micro-riblet patch is offset from the upstream end of the second micro-riblet patch in the flow-wise direction by between −3 percent and 10 percent of the chord length of the airfoil.

The gas turbine engine of any preceding or following clause, wherein the plurality of riblet patches comprises a first group of micro-riblet patches and a second group of micro-riblet patches.

The gas turbine engine of any preceding or following clause, wherein the micro-riblet patches in the first group of micro-riblet patches are spaced apart from one another at a first spanwise distance and the micro-riblet patches of the second group of micro-riblet patches are spaced apart from one another at a second spanwise distance, wherein the second spanwise distance is 60 percent or less than the first spanwise distance.

The gas turbine engine of any preceding or following clause, wherein the plurality of micro-riblet patches further comprises at least one micro-riblet patch disposed along or forward of the throat line.

The gas turbine engine of any preceding or following clause, wherein the turbine airfoil further comprises a platform, wherein the plurality of micro-riblet patches further comprises at least one micro-riblet patch disposed along the platform.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine airfoil, comprising:

a leading edge, a trailing edge, a root portion, a tip portion, a chord line defining a chord length of the turbine airfoil, a suction side surface extending in a spanwise direction from the root portion to the tip portion and in a chordwise direction between the leading edge and the trailing edge, and a throat line extending spanwise along the suction side surface from the root portion to the tip portion; and a plurality of micro-riblet patches defined along the suction side surface aft of the throat line, wherein each micro-riblet patch of the plurality of micro-riblet patches extends in a flow-wise direction between the throat line and the trailing edge, wherein at least one micro-riblet patch of the plurality of micro-riblet patches includes at least one inner riblet extending at a first flow-wise length and at least two outer riblets extending at a second flow-wise length, wherein the at least one inner riblet is disposed spanwise between the at least two outer riblets.

2. The turbine airfoil of claim 1, wherein the plurality of micro-riblet patches includes a first micro-riblet patch and a second micro-riblet patch, wherein the first micro-riblet patch is offset from the second micro-riblet patch in at least one of the flow-wise direction and the spanwise direction of the turbine airfoil.

3. The turbine airfoil of claim 1, wherein the plurality of micro-riblet patches comprises a first micro-riblet patch oriented at a first angle relative to an axial centerline of the turbine airfoil, and a second micro-riblet patch oriented at a second angle relative to the axial centerline of the turbine airfoil, wherein the first angle is greater than or less than the second angle.

4. The turbine airfoil of claim 1, wherein each micro-riblet patch of the plurality of micro-riblet patches comprises a plurality of riblets extending parallel to one another in the flow-wise direction.

5. The turbine airfoil of claim 1, wherein the first flow-wise length is greater than the second flow-wise length.

6. The turbine airfoil of claim 1, wherein the first flow-wise length is less than the second flow-wise length.

7. The turbine airfoil of claim 1, wherein the first flow-wise length is between 3 percent and 50 percent of the chord length of the turbine airfoil.

8. The turbine airfoil of claim 1, wherein the plurality of micro-riblet patches comprises a first micro-riblet patch having a downstream end and a second micro-riblet patch having an upstream end, wherein the downstream end of the first micro-riblet patch is offset in the flow-wise direction from the upstream end of the second micro-riblet patch.

9. The turbine airfoil of claim 8, wherein the downstream end of the first micro-riblet patch is offset from the upstream end of the second micro-riblet patch in the flow-wise direction by between 3 percent and 10 percent of the chord length of the turbine airfoil.

10. The turbine airfoil of claim 1, wherein the plurality of micro-riblet patches further comprises at least one micro-riblet patch disposed along or forward of the throat line.

11. The turbine airfoil of claim 1, further comprising a platform, wherein the plurality of micro-riblet patches further comprises at least one micro-riblet patch disposed along the platform.

12. A gas turbine engine, comprising:

a first turbine airfoil defining a pressure side surface;

a second turbine airfoil defining a leading edge, a trailing edge, and a suction side surface extending therebetween, wherein the pressure side surface of the first turbine airfoil and the suction side surface of the second turbine airfoil define a flowpath therebetween, wherein a throat line is defined along the suction side surface, the suction side surface comprising:

a plurality of micro-riblet patches defined along the suction side surface aft of the throat line, wherein each micro-riblet patch of the plurality of micro-riblet patches extends in a flow-wise direction between the throat line and the trailing edge, wherein at least one micro-riblet patch of the plurality of micro-riblet patches includes at least two inner riblets extending at a first flow-wise length and at least two outer riblets extending at a second flow-wise length, wherein the first flow-wise length is greater than the second flow-wise length, wherein the at least two inner riblets are disposed spanwise between the at least two outer riblets.

13. The gas turbine engine of claim 12, wherein the plurality of micro-riblet patches includes a first micro-riblet patch and a second micro-riblet patch, wherein the first micro-riblet patch is offset from the second micro-riblet patch in at least one of the flow-wise direction and a spanwise direction of the second turbine airfoil.

14. The gas turbine engine of claim 12, wherein the plurality of micro-riblet patches comprises a first micro-riblet patch oriented at a first angle relative to an axial centerline of the second turbine airfoil, and a second micro-riblet patch oriented at a second angle relative to the axial centerline of the second turbine airfoil, wherein the first angle is greater than or less than the second angle.

15. The gas turbine engine of claim 12, wherein each micro-riblet patch of the plurality of micro-riblet patches comprises a plurality of riblets extending parallel to one another in the flow-wise direction.

16. The gas turbine engine of claim 12, wherein the first flow-wise length is between 3 percent and 50 percent of a chord length of the second turbine airfoil.

* * * * *